US009509167B2

(12) United States Patent
Jenwatanavet et al.

(10) Patent No.: US 9,509,167 B2
(45) Date of Patent: Nov. 29, 2016

(54) MINIATURE WIRELESS POWER RECEIVER MODULE

(75) Inventors: Jatupum Jenwatanavet, San Diego, CA (US); Zhen Ning Low, San Diego, CA (US); Nikhil Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 688 days.

(21) Appl. No.: 13/608,795

(22) Filed: Sep. 10, 2012

(65) Prior Publication Data

US 2014/0070762 A1    Mar. 13, 2014

(51) Int. Cl.
| | | |
|---|---|---|
| H02J 7/00 | (2006.01) |
| H02J 7/02 | (2016.01) |
| H04B 5/00 | (2006.01) |
| H02J 17/00 | (2006.01) |

(52) U.S. Cl.
CPC .............. *H02J 7/025* (2013.01); *H02J 17/00* (2013.01); *H04B 5/0037* (2013.01)

(58) Field of Classification Search
CPC ...................................... H02J 7/025
USPC ......................................... 320/108
See application file for complete search history.

(56) References Cited

U.S. PATENT DOCUMENTS

| | | | |
|---|---|---|---|
| 6,498,455 B2 | 12/2002 | Zink et al. | |
| 2007/0279002 A1* | 12/2007 | Partovi | H02J 7/0027 320/115 |
| 2009/0058358 A1* | 3/2009 | Inoue | H01F 10/131 320/107 |
| 2009/0236140 A1 | 9/2009 | Randall | |
| 2009/0243397 A1* | 10/2009 | Cook et al. | 307/104 |
| 2010/0099367 A1 | 4/2010 | Shamim et al. | |
| 2010/0194334 A1* | 8/2010 | Kirby | H01M 10/46 320/108 |
| 2011/0086256 A1 | 4/2011 | Julstrom et al. | |
| 2011/0127951 A1 | 6/2011 | Walley et al. | |
| 2012/0091799 A1 | 4/2012 | Rofougaran et al. | |
| 2013/0141037 A1* | 6/2013 | Jenwatanavet et al. | 320/108 |

FOREIGN PATENT DOCUMENTS

| | | |
|---|---|---|
| KR | 100946535 B1 | 3/2010 |
| WO | WO-2013085892 A2 | 6/2013 |

OTHER PUBLICATIONS

International Search Report and Written Opinion—PCT/US2013/058273—ISA/EPO—Jan. 2, 2014.

* cited by examiner

*Primary Examiner* — Suresh Memula
(74) *Attorney, Agent, or Firm* — James T. Guitierrez

(57) ABSTRACT

An apparatus for wirelessly receiving power comprises a battery at least partially covered by magnetic material and a radio frequency (RF) charge energy receiving antenna surrounding the magnetic material and electrically coupled to the battery through a circuit card assembly (CCA).

14 Claims, 5 Drawing Sheets

MINIATURE WIRELESS POWER RECEIVER MODULE

DESCRIPTION OF THE RELATED ART

Wireless charging generally refers to a transmitting apparatus including a power source and an antenna or other structure for transferring power to the device to be charged without a wired connection, and a receiving apparatus for receiving the charging power. Designing a wireless power receiver includes antenna design, system design, battery design, and packaging design. The receiver system design may include some or all of electromagnetic interference (EMI) filtering, an antenna matching circuit, a communication circuit, a microcontroller, a voltage rectifier, a voltage regulator, a charging circuit, and other elements, all of which must be incorporated into the overall power receiver circuit design and packaging. Unfortunately, these separate systems and elements complicate the overall design of a wireless power receiver. Moreover, it is important that a wireless charging device only activate when an appropriate wireless power receiver is placed in proximity to the wireless charging device.

FIG. 1 is a schematic diagram illustrating at least a portion of the elements that may comprise a standard wireless power receiver. A wireless power receiver generally comprises a charge energy receiving antenna 12, an antenna matching circuit 14, an electromagnetic interference (EMI) filter 16, a communication (COMM) circuit 18, a micro controller unit (MCU) 20, a voltage rectifier 22, a voltage regulator 24, a charging circuit 26 and battery 28. The voltage regulator 24 can be, for example, a low dropout (LDO) converter or a buck converter.

The antenna matching circuit 14, EMI filter 16, communication (COMM) circuit 18, micro controller unit (MCU) 20, voltage rectifier 22, voltage regulator 24, and charging circuit 26 are typically designed to be implemented on a receive (RX) circuit card assembly (CCA) 30.

The communication circuit 18 receives the output of the EMI circuit 16. The MCU 20 receives the output of the communication circuit 18 and the output of the voltage rectifier 22. The MCU 20 provides a measured voltage, a measured current and battery temperature to the charging circuit 26.

Typically, the charge energy receiving antenna 12, the components of the RX CCA 30 and the battery 28 each has a separate customized design. Designing the charge energy receiving antenna 12, each element of the RX CCA 30 and the battery 28 as separate customized designs lengthens the overall design process and complicates the overall design of a wireless power receiver. Moreover, the standard wireless power receiver has no mechanism for identifying to a wireless charging device that the standard wireless power receiver is located in proximity to the wireless charging device and is ready to receive charging energy.

Therefore, it would be desirable to have a wireless power receiver that overcomes the above-mentioned deficiencies.

SUMMARY

An embodiment of an apparatus for wirelessly receiving power comprises a battery at least partially covered by magnetic material and a radio frequency (RF) charge energy receiving antenna surrounding the magnetic material and electrically coupled to the battery through a circuit card assembly (CCA).

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
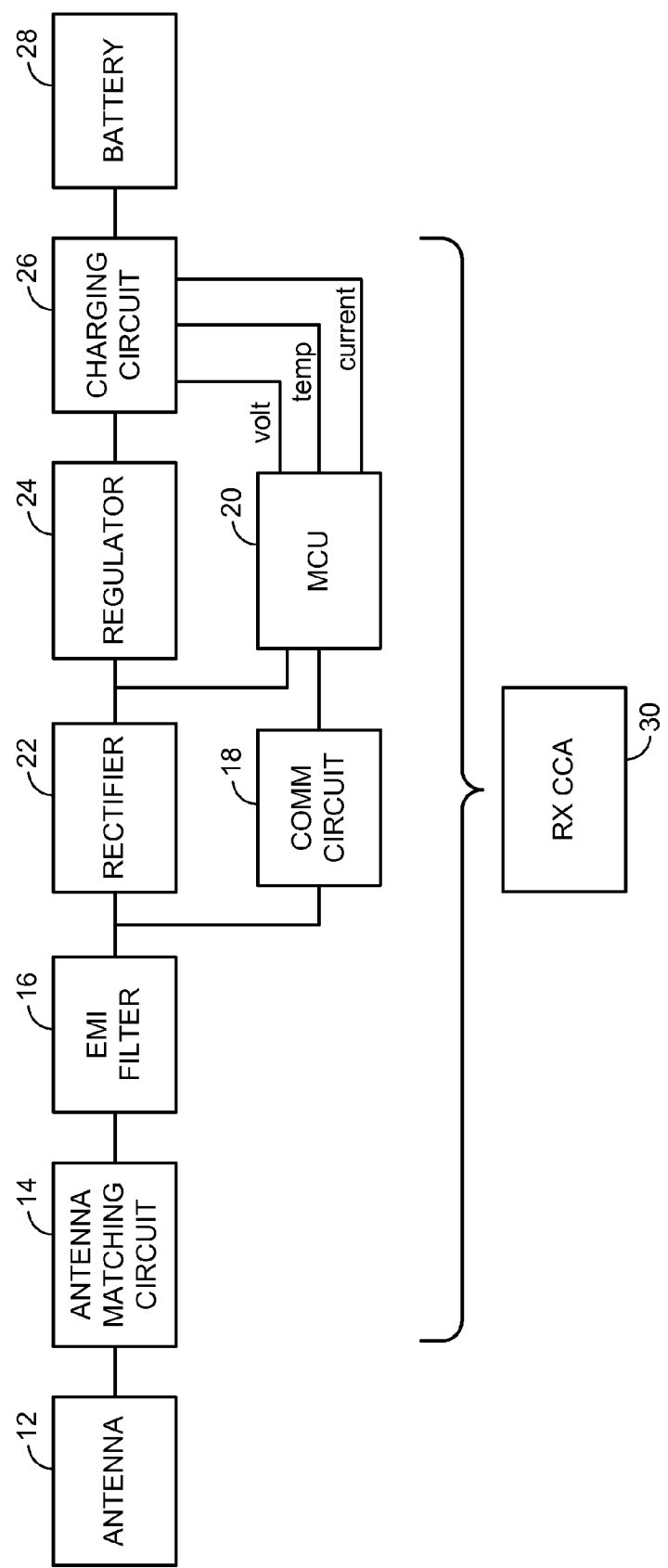
FIG. 1 is a schematic diagram illustrating at least a portion of the elements that may comprise a standard wireless power receiver.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The miniature wireless power receiver module can be incorporated into or used with what is referred to as a "personal communications hub." A personal communications hub can include a communication device, a personal digital assistant, or another personal electronic communication device along with a wireless headset, earpiece, or other device. As an example, a personal communications hub may include a wrist-worn device that functions as a communication device and/or a display device and a wireless earpiece or headset that is wirelessly coupled to the wrist-worn device. The wireless earpiece or headset is used for audible communication. These devices are powered by rechargeable power sources, which are charged by a charging system or charging station. The charging system is also referred to as a wireless power transmitter. Each device may incorporate a miniature wireless power receiver module.

Figure 2:
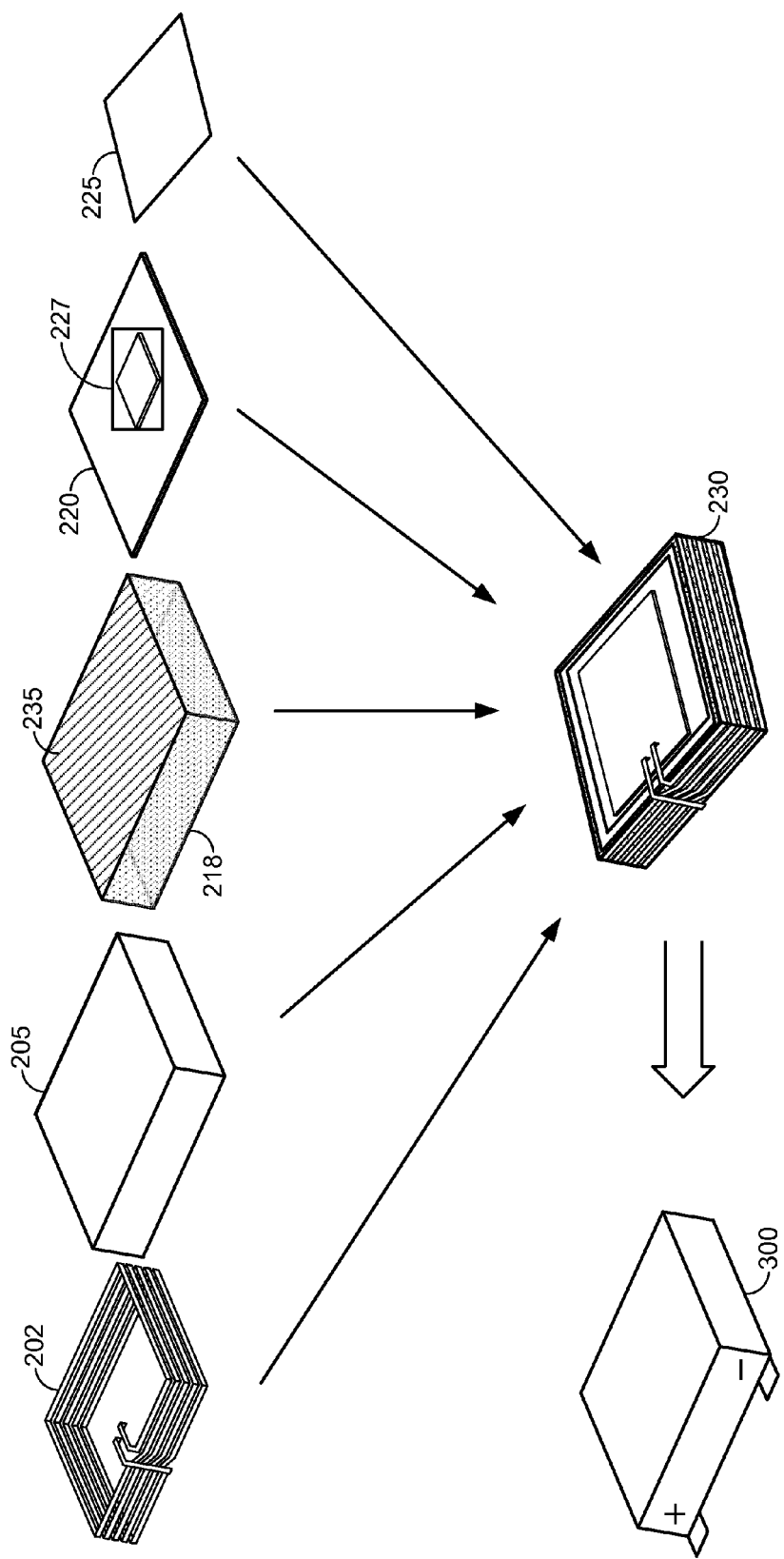
FIG. 2 is a schematic diagram illustrating a first embodiment of a miniature wireless power receiver including RFID proximity detection.

FIG. 2 is a schematic diagram 200 illustrating a first embodiment of a miniature wireless power receiver module. A radio frequency (RF) charge energy receiving antenna 202, magnetic material 205, battery 218, RX CCA 220 and a radio frequency identification (RFID) antenna 225 can be integrated into a single intermediate module 230. The battery 218 can be at least partially covered by the magnetic material 205. The RF charge energy receiving antenna 202 surrounds the magnetic material 205 and the battery 218 and is electrically coupled to the battery 218 through the RX CCA 220. The RX CCA 220 is electrically coupled to the RF charge energy receiving antenna 202, to the battery 218, to the radio RFID antenna 225 and to the RFID circuitry 227. In an embodiment, the RF charge energy receiving antenna 202 can be implemented as a coil that can be cylindrically wound around the battery 218 and magnetic material 205. Alternatively, the RF charge energy receiving antenna 202 can be implemented as a planar coil, or any other shape that can surround the battery 218 and the magnetic material 205.

In an embodiment, metal material 235 can be located between the battery 218 and the magnetic material 205. The metal material 235 can at least partially cover the battery 218 and is shown as covering only the top of the battery 218 for illustration purposes only.

In this example, the circuitry 227 is operable with the RFID antenna 225 to allow the miniature wireless power receiver module the ability to communicate to a wireless charging device that an appropriate charge-receiving device is located in proximity to the wireless charging device. The RF charge energy receiving antenna 202 and the RFID antenna 225 can be responsive to signals having different frequencies. In an embodiment, the RF charge energy receiving antenna 202 can be tuned to be responsive to a frequency of approximately 6.78 MHz and the RFID antenna 225 can be tuned to be responsive to a frequency of approximately 13.56 MHz. These frequencies are examples only. The RFID antenna 225 can be operated at other frequencies in the RFID spectrum. The RFID antenna 225 can be implemented as a loop antenna, or as another configuration, such as a dipole antenna, depending on the operating frequency. An operating frequency higher than 13.56 MHz can allow an RFID antenna configuration other than a loop.

The intermediate module 230 can be packaged to include a cover and electrical contacts, to form a final miniature wireless power receiver module 300. In addition to the circuitry 227 operable with the RFID antenna 225 to allow the miniature wireless power receiver the ability to communicate to the wireless charging device (not shown) whether an appropriate charge-receiving device is located in proximity to the wireless charging device, the RX CCA 220 can include some or all of the elements described in FIG. 1 as being associated with the RX CCA 30.

The RFID antenna 225 and the circuitry 227 can be used to identify to a wireless charging device the presence of the battery 218 and the ability of the battery 218 to receive a charge. A charging circuit located on the RX CCA 220 can control the amount of charging energy provided to the battery 218 based on the state of charge of the battery 218, the temperature of the battery 218, and on other factors.

Integrating the components of the miniature wireless power receiver into a single module 300 helps to electromagnetically isolate the miniature wireless power receiver from the device in which it is installed, such as a headset or a wristwatch. Locating the RF charge energy receiving antenna 202 in close proximity to the battery 218 and to the RX CCA 220 also maximizes charging efficiency of the battery 218. The module 300 can be adapted to a variety of devices and battery capacities and can be transferred to different devices that can be designed to use the same wireless power receiver module.

Figure 3:
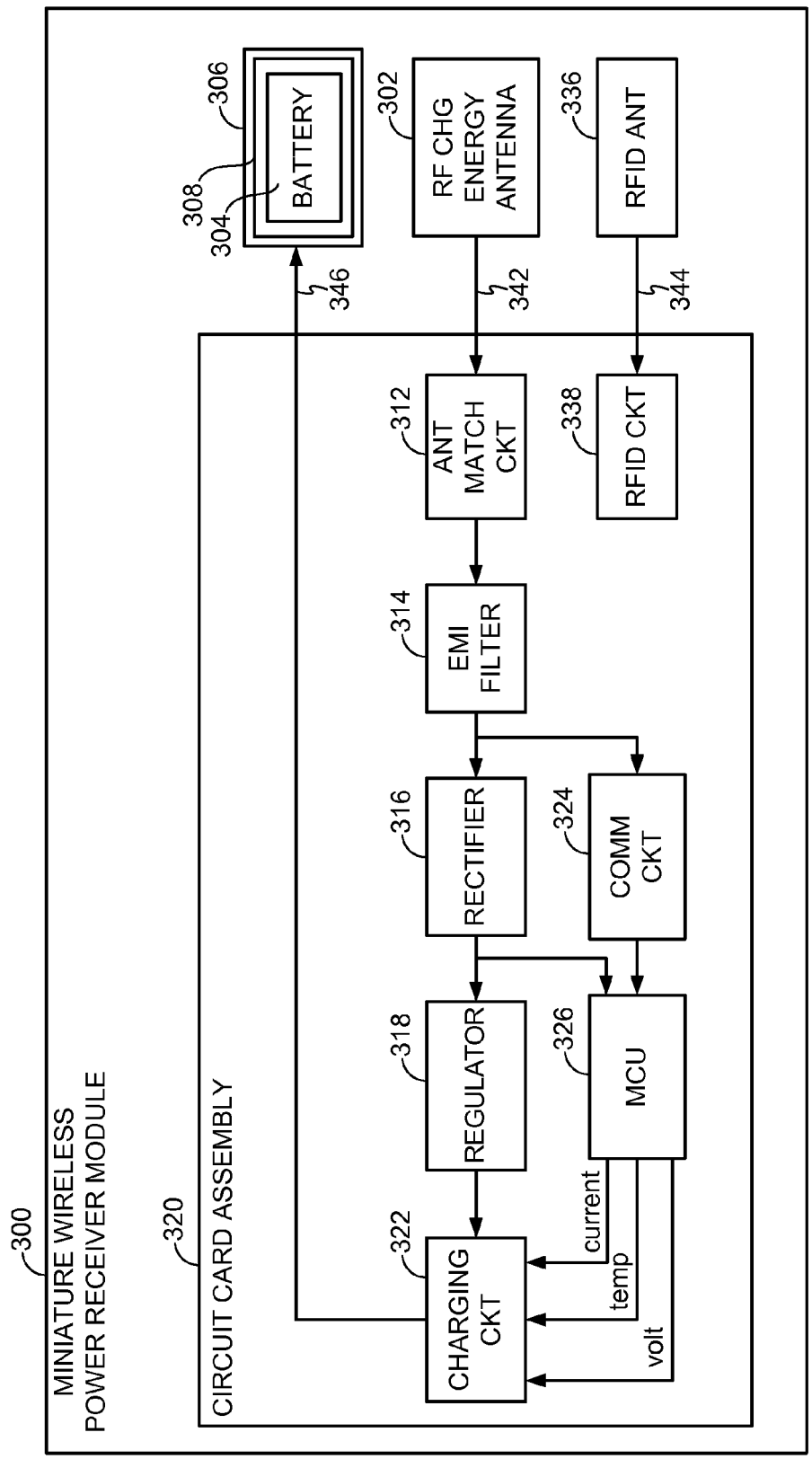
FIG. 3 is a functional block diagram illustrating an embodiment of the miniature wireless power receiver module of FIG. 2.

FIG. 3 is a functional block diagram illustrating an embodiment of the miniature wireless power receiver module of FIG. 2. The miniature wireless power receiver module 300 comprises a circuit card assembly (CCA) 320, a battery 304, an RF charge energy receiving antenna 302, and an RFID antenna 336. In the embodiment shown in FIG. 3, the battery 304 can be at least partially covered by magnetic material 306. Optionally, metal material 308 can be located between the battery 304 and the magnetic material 306. In an embodiment, either or both of the magnetic material 306 and the metal material 308 can at least partially cover the battery 304. In an embodiment, either or both of the magnetic material 306 and the metal material 308 can completely cover the battery 304. Further, one of the magnetic material 306 and the metal material 308 may partially cover the battery 304 while the other of the magnetic material 306 and the metal material 308 completely covers the battery 304. As used herein. The term "cover" refers to either or both of the magnetic material 306 and the metal material 308 covering some or all of the external surfaces of the battery 304.

The RF charge energy receiving antenna 302, while structurally surrounding the battery 304, is illustrated in FIG. 3 as being separated from the battery 304 to emphasize that the RF charge energy receiving antenna 302 is not directly electrically connected to the battery 304, but is instead connected to the battery 304 through the CCA 320. The RF charge energy receiving antenna 302 is connected to the CCA 320 over connection 342 and receives charging energy from the CCA 320 over connection 346.

In an embodiment, the RF charge energy receiving antenna 302 can be tuned to be responsive to a frequency of approximately 6.78 MHz and the RFID antenna 336 can be tuned to be responsive to a frequency of approximately 13.56 MHz. These frequencies are examples only. The RFID antenna 336 can be operated at other frequencies in the RFID spectrum. The RFID antenna 336 can be implemented as a loop antenna, or as another configuration, such as a dipole antenna, depending on the operating frequency. An operating frequency higher than 13.56 MHz can allow an RFID antenna configuration other than a loop. The RF charge energy receiving antenna 302 can be implemented as loop antenna, a cylindrical coil, a planar coil, or as another configuration, depending on the operating frequency.

The RFID antenna 336 is coupled to an RFID circuit 338 over connection 344. The RFID circuit 338 is located on the circuit card assembly 320 and comprises the circuitry used to receive and process the RFID signal from the RFID antenna 336. The circuit card assembly 320 also comprises an antenna matching circuit 312, an EMI filter 314, a communication (COMM) circuit 324, a micro controller unit (MCU) 326, a voltage rectifier 316, a voltage regulator 318, and a charging circuit 322. The voltage regulator 318 can be, for example, a low dropout (LDO) converter or a buck converter. The charging circuit 322 is electrically connected to the battery 304 to provide charging energy to the battery 304 over connection 346.

The communication circuit 324 receives the output of the EMI filter 314. The MCU 326 receives the output of the communication circuit 324 and the output of the voltage rectifier 316. The MCU 326 provides a measured voltage, a measured current and battery temperature to the charging circuit 322. The charging circuit 322 provides charging energy to the battery 304.

Figure 4:
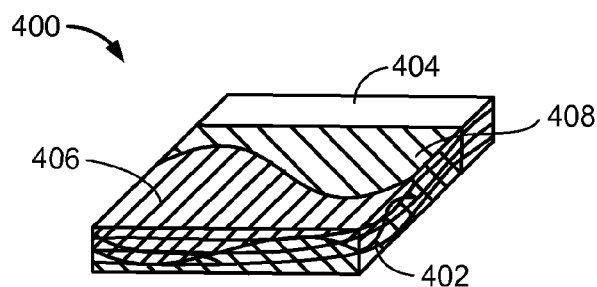
FIG. 4 is a diagram illustrating a first embodiment of a battery of the miniature wireless power receiver module of FIG. 3.

FIG. 4 is a diagram illustrating a first embodiment of a battery of the miniature wireless power receiver module 300 of FIG. 3. The battery 404 can be at least partially covered by magnetic material 406. In an alternative embodiment, optional metal material 408 can be located between the magnetic material 406 and the battery 404. Any or both of the metal material 408 and the magnetic material 406 can partially or completely cover the battery 404, depending upon implementation. Regardless of whether the metal material 408 and the magnetic material 406 partially or completely cover the battery 404, the battery 404 is surrounded by an RF charge energy receiving antenna 402. The RF charge energy receiving antenna 402 can comprise a cylindrical antenna, a planar antenna, or any other antenna configuration.

Figure 5:
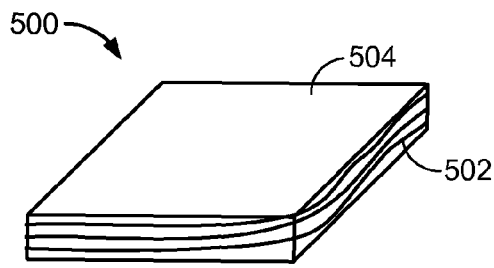
FIG. 5 is a diagram illustrating a second embodiment of a battery of the miniature wireless power receiver module of FIG. 3.

FIG. 5 is a diagram illustrating a second embodiment of a battery of the miniature wireless power receiver module 300 of FIG. 3. In the embodiment shown in FIG. 5, the battery 504 is surrounded by an RF charge energy receiving antenna 502. As described above, the RF charge energy receiving antenna 502 can comprise a cylindrical antenna, a planar antenna, or any other antenna configuration.

Figure 6:
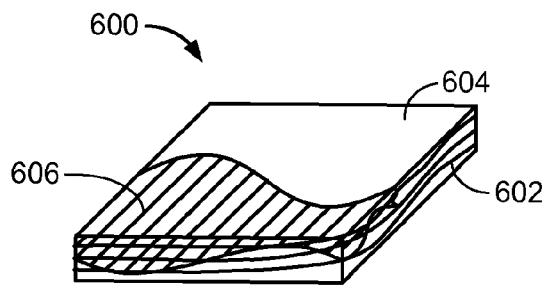
FIG. 6 is a diagram illustrating a third embodiment of a battery of the miniature wireless power receiver module of FIG. 3.

FIG. 6 is a diagram illustrating a third embodiment of a battery of the miniature wireless power receiver module 300 of FIG. 3. The battery 604 can be at least partially covered by magnetic material 606. However, the magnetic material 606 can partially or completely cover the battery 604, depending upon implementation. Regardless of whether the magnetic material 606 partially or completely covers the battery 604, an RF charge energy receiving antenna 602 surrounds the battery 604 and the magnetic material 606, and can comprise a cylindrical antenna, a planar antenna, or any other antenna configuration.

Figure 7:
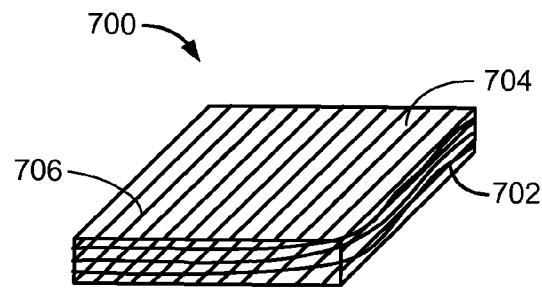
FIG. 7 is a diagram illustrating a fourth embodiment of a battery of the miniature wireless power receiver module of FIG. 3.

FIG. 7 is a diagram illustrating a fourth embodiment of a battery of the miniature wireless power receiver module 300 of FIG. 3. In the embodiment shown in FIG. 7, the battery 704 is completely covered by magnetic material 706. In an alternative embodiment, optional metal material (not shown in FIG. 7) can be located between the magnetic material 706 and the battery 704. The battery 704 and the magnetic material 706 are surrounded by an RF charge energy receiving antenna 702. The RF charge energy receiving antenna 702 can comprise a cylindrical antenna, a planar antenna, or any other antenna configuration.

Figure 8:
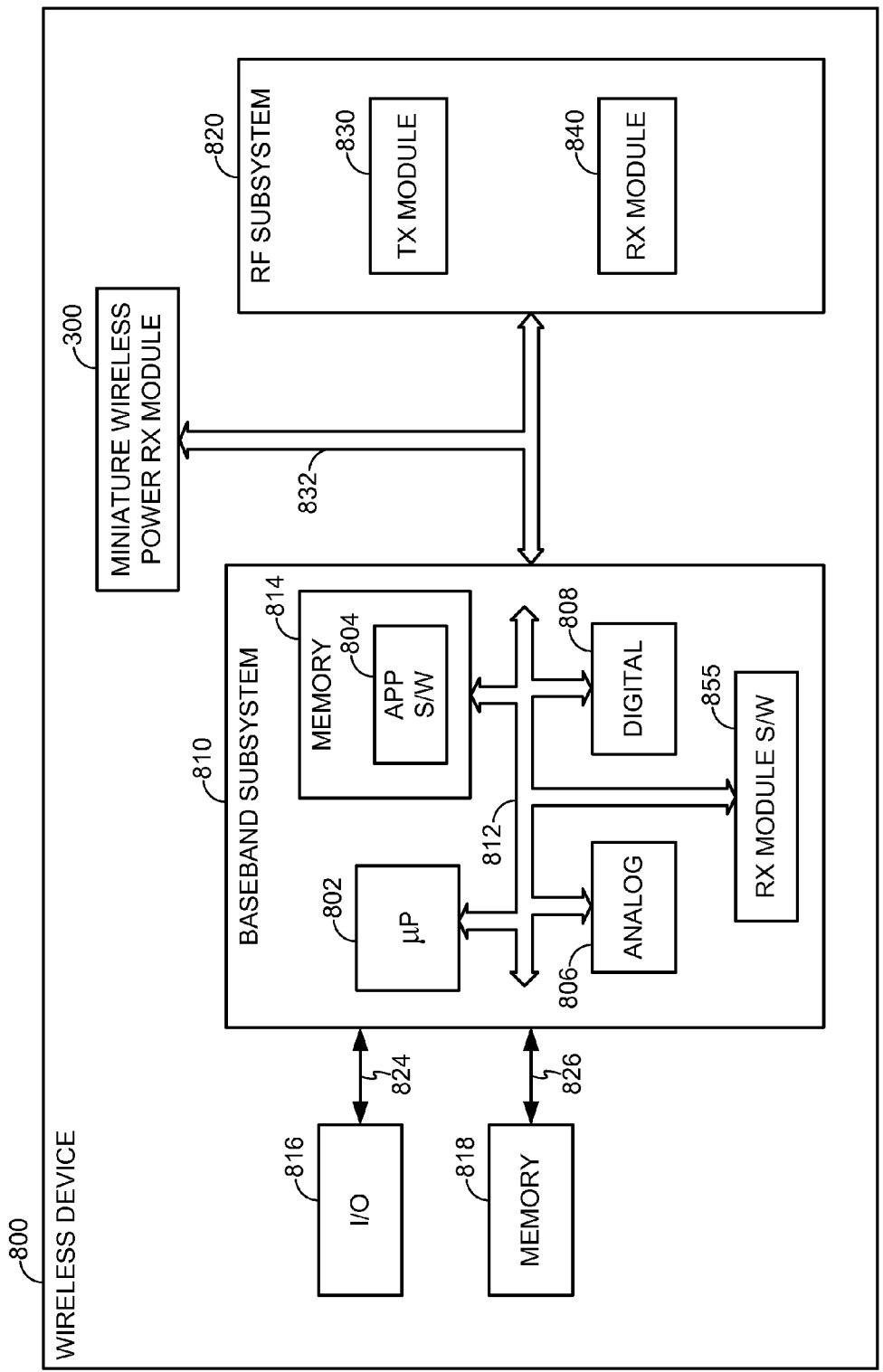
FIG. 8 is a block diagram illustrating an example of a wireless device in which the miniature wireless power receiver module can be implemented.

FIG. 8 is a block diagram illustrating an example of a wireless device 800 in which the miniature wireless power receiver module 300 can be implemented. In an embodiment, the wireless device 800 can be a "Bluetooth" wireless communication device, a portable cellular telephone, a WiFi enabled communication device, or can be any other communication device. Embodiments of the miniature wireless power receiver module can be implemented in any device having an RF transmitter, RF receiver or RF transceiver. The wireless device 800 illustrated in FIG. 8 is intended to be a simplified example of a cellular telephone and to illustrate one of many possible applications in which the miniature wireless power receiver module 300 can be implemented. One having ordinary skill in the art will understand the operation of a portable cellular telephone, and, as such, implementation details are omitted. In an embodiment, the wireless device 800 includes a baseband subsystem 810, an RF subsystem 820 and the miniature wireless power receiver module 300 connected together over a system bus 832. The system bus 832 can comprise physical and logical connections that enable the connected elements to communicate. In an embodiment, the RF subsystem 820 can be a wireless transceiver. Although details are not shown for clarity, the RF subsystem 820 generally includes a transmit module 830 having modulation, upconversion and amplification circuitry for preparing a baseband information signal for transmission, and includes a receive module 840 having amplification, filtering and downconversion circuitry for receiving and downconverting an RF signal to a baseband information signal to recover data. The details of the operation of the RF subsystem 820 are known to those skilled in the art.

The baseband subsystem generally includes a processor 802, which can be a general purpose or special purpose microprocessor, memory 814, application software 804, analog circuit elements 806, digital circuit elements 808 and receive module software 855, coupled over a system bus 812. The system bus 812 can comprise physical and logical connections that enable the connected elements to communicate. The system bus 812 can include the physical and logical connections to couple the above-described elements together and enable their interoperability.

An input/output (I/O) element 816 is connected to the baseband subsystem 810 over connection 824 and a memory element 818 is coupled to the baseband subsystem 810 over connection 826. The I/O element 816 can include, for example, a microphone, a keypad, a speaker, a pointing device, user interface control elements, and any other devices or system that allow a user to provide input commands and receive outputs from the portable communication device 800.

The memory 818 can be any type of volatile or non-volatile memory, and in an embodiment, can include flash memory. The memory element 818 can be permanently installed in the portable communication device 800, or can be a removable memory element, such as a removable memory card.

The processor 802 can be any processor that executes the application software 804 to control the operation and functionality of the portable communication device 800. The memory 814 can be volatile or non-volatile memory, and in an embodiment, can be non-volatile memory that stores the application software 804. If portions of the control of the miniature wireless power receiver module are implemented in software, then the baseband subsystem 810 also includes receive module software 855, which may cooperate with control logic that can be executed by the microprocessor 802, or by another processor, to control the operation of the miniature wireless power receiver module 300.

The analog circuitry 806 and the digital circuitry 808 include the signal processing, signal conversion, and logic that convert an input signal provided by the I/O element 816 to an information signal that is to be transmitted. Similarly, the analog circuitry 806 and the digital circuitry 808 include the signal processing elements used to generate an information signal that contains recovered information. The digital circuitry 808 can include, for example, a digital signal processor (DSP), a field programmable gate array (FPGA), or any other processing device. Because the baseband subsystem 810 includes both analog and digital elements, it can be referred to as a mixed signal device (MSD).

When implemented as shown in FIG. 8, the miniature wireless power receiver module 300 is implemented as a pluggable module that can be easily integrated into the wireless device 800 such that the miniature wireless power receiver module 300 appears generally as a battery to the wireless device 800. In this manner, the design, function and structure of the miniature wireless power receiver module 300 can be optimized, while allowing it to be implemented as a module in a variety of devices.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. An apparatus for wirelessly receiving power, comprising:
   a battery at least partially covered by magnetic material;
   a radio frequency (RF) charge energy receiving antenna surrounding the magnetic material and electrically coupled to the battery through a circuit card assembly (CCA), wherein the RF charge energy receiving antenna is a cylindrical coil surrounding the battery and the magnetic material; and
   a radio frequency identification (RFID) antenna and RFID circuitry coupled to the CCA, the RFID antenna and RFID circuitry configured to identify a presence of the apparatus to a charging device, wherein the RF charge energy receiving antenna, the battery at least partially covered by the magnetic material, the CCA, the RFID antenna, and the RFID circuitry are integrated into a single module configured to be included in a personal communications hub.

2. The apparatus of claim 1, wherein the CCA further comprises a charging circuit configured to provide battery charge state and battery temperature information to determine an amount of charging energy provided to the battery.

3. The apparatus of claim 2, wherein the RF charge energy receiving antenna is responsive to RF energy at a first frequency and the RFID antenna is responsive to RF energy at a second frequency.

4. The apparatus of claim 3, wherein the RF charge energy receiving antenna is responsive to RF energy at a frequency of approximately 6.78 MHz and the RFID antenna is responsive to RF energy at a frequency of approximately 13.56 MHz.

5. The apparatus of any of claims 1, 2, 3, and 4, wherein the magnetic material completely covers the battery.

6. The apparatus of any of claims 1, 2, 3, and 4, further comprising metal material located between the battery and the magnetic material.

7. The apparatus of any of claims 1, 2, 3, and 4, further comprising metal material located between the battery and the magnetic material, wherein the metal material and the magnetic material completely cover the battery.

8. An apparatus for wirelessly receiving power, comprising:
   a battery;
   a radio frequency (RF) charge energy receiving antenna surrounding and electrically coupled to the battery through a circuit card assembly (CCA), the RF charge energy receiving antenna being a cylindrical coil surrounding the battery;
   magnetic material at least partially covering the battery, wherein the RF charge energy receiving antenna surrounds the magnetic material and the battery; and
   a radio frequency identification (RFID) antenna and RFID circuitry coupled to the CCA, the RFID antenna and RFID circuitry configured to identify a presence of the apparatus to a charging device, wherein the RF charge energy receiving antenna, the battery, the CCA, the RFID antenna, and the RFID circuitry are integrated into a single module configured to be included in a personal communications hub.

9. The apparatus of claim 8, wherein the CCA further comprises a charging circuit configured to provide battery charge state and battery temperature information to determine an amount of charging energy provided to the battery.

10. The apparatus of claim 9, wherein the RF charge energy receiving antenna is responsive to RF energy at a first frequency and the RFID antenna is responsive to RF energy at a second frequency.

11. The apparatus of claim 10, wherein the RF charge energy receiving antenna is responsive to RF energy at a frequency of approximately 6.78 MHz and the RFID antenna is responsive to RF energy at a frequency of approximately 13.56 MHz.

12. The apparatus of any of claims 8, 9, 10, and 11, wherein the magnetic material completely covers the battery.

13. The apparatus of any of claims 8, 9, 10, and 11, further comprising metal material located between the battery and the magnetic material.

14. The apparatus of claim 13, wherein the metal material and the magnetic material completely cover the battery.

* * * * *